Oct. 6, 1964     G. CISAR     3,151,821
FRICTION COUPLING AND MOUNTING ARRANGEMENT FOR FILM SPOOLS
Filed July 17, 1961     2 Sheets-Sheet 1
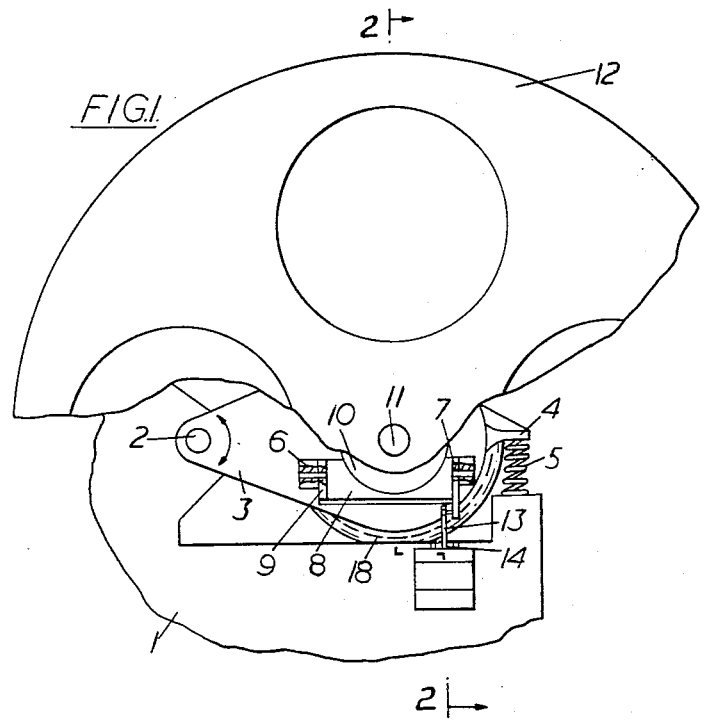
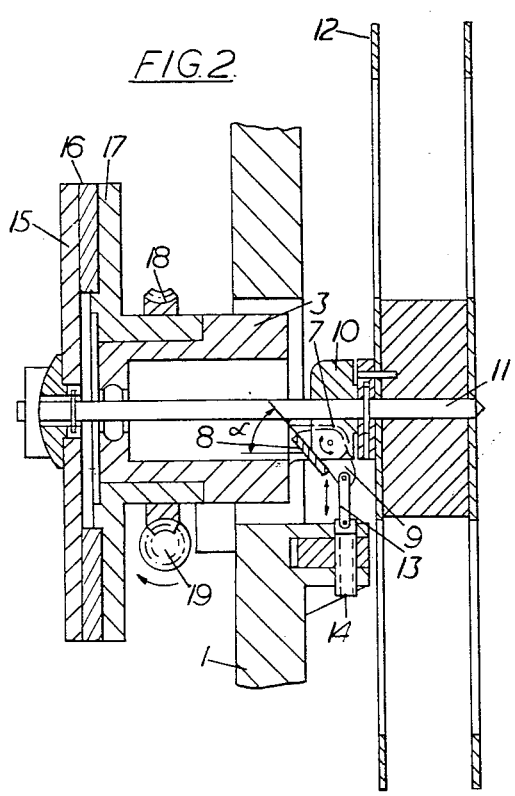
Inventor
GÜNTHER CISAR
By Irwin J. Thompson
Attorney

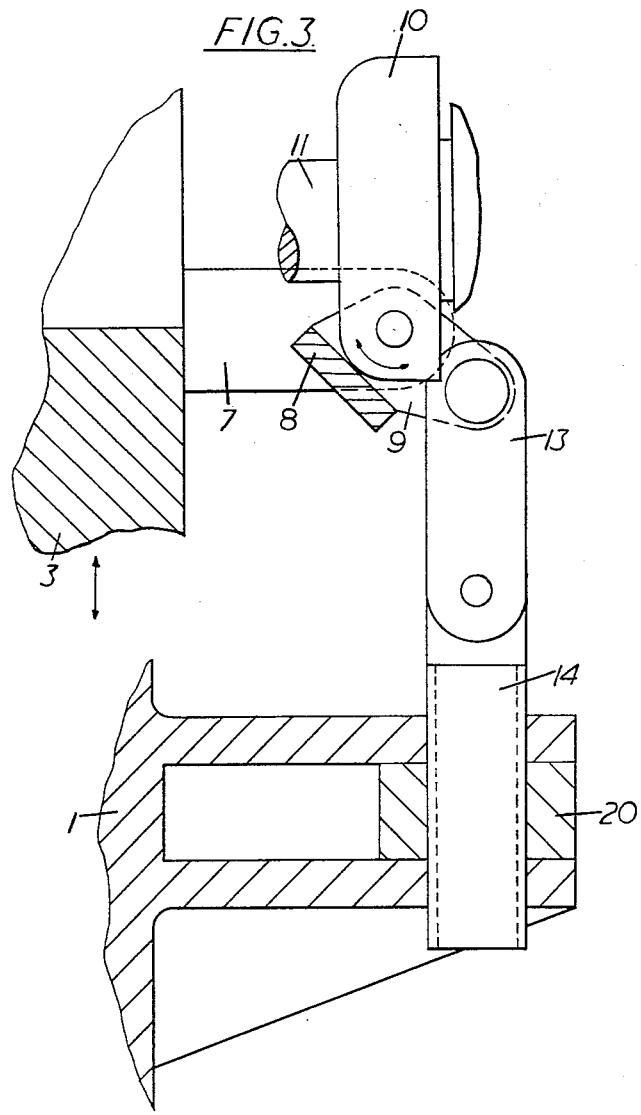

United States Patent Office 3,151,821
Patented Oct. 6, 1964

3,151,821
FRICTION COUPLING AND MOUNTING
ARRANGEMENT FOR FILM SPOOLS
Günther Cisar, Dresden, Germany, assignor to VEB Kamera- und Kinowerke Dresden, Dresden, Germany
Filed July 17, 1961, Ser. No. 124,608
3 Claims. (Cl. 242—55.14)

This invention relates to a friction coupling and mounting for film spools, the bearing pressure of which is determined by the weight of the spool and the varying film weight.

Weight-dependent slipping friction couplings are already known wherein the weight $G_F$ of the film upon a thrust bearing constructed as inclined plane with the angle of inclination $\alpha$ experiences a component division, one force component being taken up by the thrust bearing and the other acting upon a slipping friction coupling. The pressure acting on the coupling here follows the equation $$P = G_F \cdot \tan \alpha$$

The weight $G_F$ of the film coil increases as the function of the square of the film coil diameter and thus also does the winding moment. By appropriate selection of the actual spool weight, which is added also to $G_F$, the winding characteristics can be so varied that with increasing film coil radius the film tension remains constant within certain limits.

The disadvantage of this known friction coupling consists however in that in the case of spools of large capacity or in the case of film 70 mm. wide, the film tension can no longer be kept nearly constant due to the excessively great film weight. In the case of 1800 m. spools for 35 mm. film for example the weight increases in the ratio 1:11 and consequently so does the friction moment, so that a distortion of the film at the innermost part of the film coil occurs and the film may become scratched. In the case of such high film traction the danger even exists of breaking of the film. In order to wind the film without excessive tension occurring, in the case of the above-stated example only an increase of moment of approximately 1:4 would be necessary.

It is an object of the present invention to provide a weight-dependent slipping friction coupling which ensures a nearly constant tension of the film over the entire coil diameter, even in the case of a great increase of weight due to the use of film spools of large capacity.

In accordance with the invention this problem is solved by means of a thrust bearing constructed as an inclined plane for the film spool, the inclination of which plane in relation to the horizontal is dependent upon weight. Since in the case of increasing film weight the angle of inclination $\alpha$ of the thrust bearing decreases, according to the above equation the force component acting upon the friction coupling can no longer increase in proportion with the film weight. The film tension on the contrary is held in the limits necessary to ensure no scratching or breakage of the film.

A constructional form of the invention will now be described by way of example with reference to the accompanying drawings in which:

FIGURE 1 is an elevation of the film spool mounting with the film spool shown cut away for clarity;

FIGURE 2 is a sectional view taken along the line 2—2 in FIGURE 1; and

FIGURE 3 is a sectional view on an enlarged scale also taken along the line 2—2 in FIGURE 1 showing the thrust bearing and adjustment means therefor.

The projector housing, forming a support member, 1 is provided with a shaft 2, which serves as pivot point for a club-shaped lever 3. Beneath a nose 4 of the lever 3 there is arranged a spring 5, the counter-abutment of which again is formed by the projector housing 1. On the lever 3 there are situated two mountings 6 and 7, between a thrust bearing 9 provided with an inclined plate 8 is mounted for pivoting in the indicated direction of the arrow. The inclined plate serves as support surface for a bearing bush 10 of the winding shaft 11, on which there is situated the film spool 12. On the thrust bearing 9 there is articulated a link 13 which is pivotally connected with a set screw 14 movable in the vertical direction in the projector housing 1. On the other end of the winding shaft 11 there is keyed a disc 15, which rests against a friction lining 16. The friction lining 16 is secured to a bush 17 on which there is arranged a worm wheel 18 which is driven through a worm 19 mounted pivotably in known fashion (not shown). 20 designates a lock nut.

The manner of operation is as follows:

At the commencement of the winding operation the inclined plate 8 forms a specific, relatively large angle $\alpha$ with the horizonotal, whereby a specific basic friction moment is produced on the friction coupling 15, 16, 17. As the film weight increases however the lever 3 is moved downwards against the action of the spring 5, since the film weight acts through the bearing bush 10 upon the thrust bearing 9 connected with the lever 3. Since the thrust bearing 9 is pivotably suspended between the mountings 6 and 7 (on lever 3) and also is articulatedly connected with the link 13, in the downward movement of the lever 3 the angle $\alpha$ varies, and in fact it reduces. The thrust bearing 9 is rotated by reaction against the link 13 as the bearing 9 moves down. With an increase of the film weight thus there progresses a reduction of the angle of inclination $\alpha$ of the inclined plate 8 tending to reduce the moments due to the weight of the film and spool about the point of contact of the bush 10 on the inclined plate 8. This reduction of moments occurs due to the fact that the point of contact between the curved surface of the bush 10 and the inclined plate 8 moves towards the film spool. The values responsible according to the stated equation for the pressure on the slipping coupling 15, 16, 17 are thus contrary to one another, and the excessively high friction moments establishing themselves in the known weight-dependent couplings according to the principle of the inclined plane as a result of very high film weight are reliably avoided.

As film is rolled on the reel 12 of the apparatus of FIGURE 2, the torque on shaft 11 necessary to maintain constant film tension increases steadily in proportion to the change in radius of the film on the reel. In the prior art devices with fixed inclined plates the pressure on the friction coupling increased in proportion to the change in diameter squared or radius squared of the film on the reel. The overcompensation with resulting increased film tension, of the prior art, is prevented in the apparatus of FIGURE 2 by deflecting inclined plate 8 to the left so that the increased torque on shaft 11 increases in proportion to the change in radius and not in proportion to the change in radius squared. With increased weight of film on reel 12 the shaft 11 moves to the right to increase the torque necessary to maintain constant film tension and simultaneously the movement of shaft 11 to the right is partially counterbalanced by the deflection of inclined plate 8.

Furthermore it is possible for the person projecting the film to vary the basic level of the film tension according to need by means of the set screw 14 movable by the lock nut 20, for due to the position thereof the initial angle on the inclined plane is determined. Furthermore the possibility exists for him of influencing the winding characteristics by selection of the spring 5 of specific spring constant.

I claim:

1. A weight-dependent slipping friction coupling and mounting arrangement for a film spool, comprising a support member, a lever pivotally mounted on the support member, resilient means arranged between said support member and a portion on said lever offset from the pivot thereof so as to be loaded by the lever in accordance with the varying weight of the film spool, a first bearing member, having an inclined surface, pivotally mounted on said lever, means connected between said support member and a portion on said first bearing member offset from the pivot thereof and capable of varying the angle of inclination of said inclined surface on movement of the first bearing member in relation to said support member, a winding shaft, a second bearing member carrying said winding shaft at a position along the length thereof, said second bearing member having a bearing surface, constituting a pivot whose position is variable, in engagement with the inclined surface of said first bearing member, means on said winding shaft on one side of said second bearing member for receiving a film spool, winding shaft driving means, and a slipping friction coupling connected between said driving means and the winding shaft at a position on the latter on the other side of said second bearing member.

2. A weight-dependent slipping friction coupling and mounting arrangement for a film spool, comprising a support member, a lever, pivotally mounted at one end thereof on the support member and movable in a vertical plane, a nose extending from the other end of said lever, a compression spring arranged between said support member and said nose so as to be compressed in accordance with the varying weight of the film spool, a first bearing member, having an inclined surface, pivotally mounted on said lever between the ends of the latter, means connected between said support member and a portion on said first bearing member offset from the pivot thereof and capable of varying the inclination of said inclined surface on movement of the first bearing member in relation to said support member, a winding shaft, a second bearing member carrying said winding shaft at a position along the length thereof, said second bearing member having a convexly curved bearing surface in engagement with the inclined surface of said first bearing member, means on said winding shaft on one side of said second bearing member for receiving a film spool, winding shaft driving means, and a slipping friction coupling connected between said driving means and the winding shaft at a position on the latter on the other side of said second bearing member.

3. A weight-dependent slipping friction coupling and mounting arrangement for a film spool according to claim 1, wherein said means connected between said support member and a portion on said first bearing member comprises a link pivotally connected at one end thereof to said first bearing member, and an axially adjustable screw engaging a threaded bore in the support member, said link being connected at its other end to said screw.

References Cited in the file of this patent
UNITED STATES PATENTS

| | | |
|---|---|---|
| 2,082,328 | Ensign et al. | June 1, 1937 |
| 2,654,543 | May | Oct. 6, 1953 |
| 2,973,913 | Thevenaz | Mar. 7, 1961 |